United States Patent
Clapper, Jr.

[11] Patent Number: 5,980,385
[45] Date of Patent: Nov. 9, 1999

[54] ELECTRONIC APPARATUS AND METHOD OF ASSISTING IN THE PLAY OF A GAME AND TICKETS USED THEREWITH

[76] Inventor: Ronald C. Clapper, Jr., 2119 Hein Hill Rd., Mountoursville, Pa. 17754

[21] Appl. No.: 09/042,837

[22] Filed: Mar. 17, 1998

Related U.S. Application Data

[63] Continuation-in-part of application No. 08/811,613, Mar. 5, 1997, Pat. No. 5,810,664, which is a continuation of application No. 08/500,053, Jul. 10, 1995, Pat. No. 5,609,337, which is a continuation of application No. 08/300,130, Sep. 2, 1994, abandoned, which is a continuation-in-part of application No. 08/999,268, Nov. 16, 1992, Pat. No. 5,337,975, which is a continuation-in-part of application No. 08/879,747, May 6, 1992, Pat. No. 5,348,299.

[51] Int. Cl.⁶ .................................................. A63F 3/06
[52] U.S. Cl. .......................................... 463/17; 273/138.1
[58] Field of Search ................................. 463/16, 17, 18, 463/20, 21; 273/138.1, 139

[56] References Cited

U.S. PATENT DOCUMENTS

| | | | |
|---|---|---|---|
| 4,677,553 | 6/1987 | Roberts et al. | 463/17 |
| 4,842,278 | 6/1989 | Markowicz | 463/18 |
| 5,580,311 | 12/1996 | Haste, III | 463/29 |
| 5,595,538 | 1/1997 | Haste, III | 463/17 |
| 5,628,684 | 5/1997 | Bouedec | 463/17 |
| 5,657,899 | 8/1997 | Stoken | 221/1 |
| 5,772,510 | 6/1998 | Roberts | 463/17 |

Primary Examiner—Kien T. Nguyen
Attorney, Agent, or Firm—Robert J. Schaap

[57] ABSTRACT

An electronic apparatus which operates a technological aid and effectively electronically assists in the play of games of chance as, for example, that game of chance known as "Pull-Tab." The apparatus is generally played by a single player and is designed to dispense a ticket containing indicia thereon. A large number of tickets are in the apparatus and the player actuates the apparatus and obtains a dispensed ticket. The apparatus is primarily designed for entertainment purposes only. The tickets installed in each of the apparatus are randomly selected from a larger group of these tickets and the balance of these tickets are located in other like apparatus. If the indicia which appears on the ticket constitutes winning or scoring indicia, the player obtains a reward as, for example, a pay-off in money. Only a limited number of the tickets contain any winning or scoring indicia. All tickets are pre-printed and may be dispensed from a bin containing pre-cut tickets or severed from a strip in the form of a roll. The apparatus comprises a display means which displays each of the indicia on a ticket. The display is operated in a manner so that the indicia are effectively sequentially displayed horizontally. The tickets are constructed so that a cover strip can be pulled from one side to the other to sequentially display the indicia on the ticket.

22 Claims, 7 Drawing Sheets

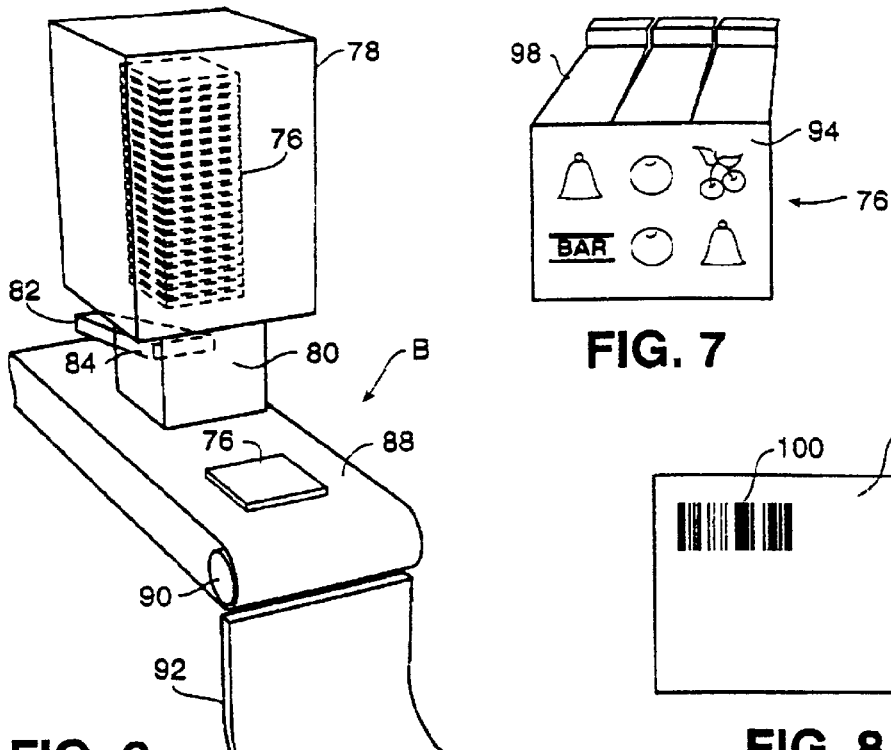
FIG. 6
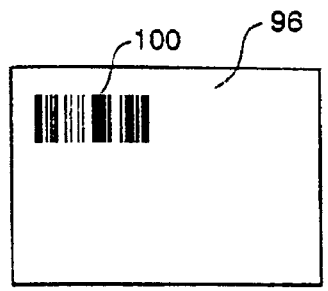
FIG. 7
FIG. 8
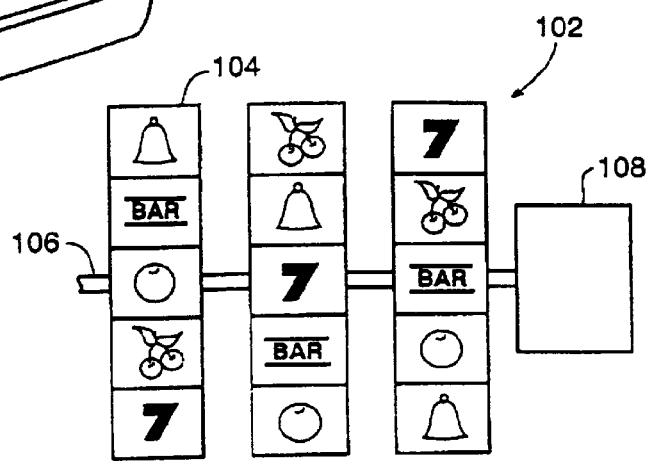
FIG. 9
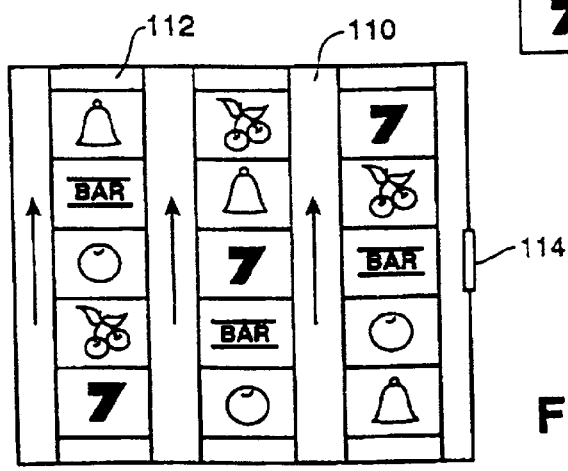
FIG. 10

ELECTRONIC APPARATUS AND METHOD OF ASSISTING IN THE PLAY OF A GAME AND TICKETS USED THEREWITH

RELATED APPLICATION

This application is a continuation-in-part of my U.S. patent application Ser. No. 08/811,613, filed Mar. 5, 1997, now U.S. Pat. No. 5,810,664 for Electronic Gaming Apparatus and Method and which is, in turn, a continuation of my U.S. patent application Ser. No. 08/500,053, filed Jul. 10, 1995, (now U.S. Pat. No. 5,609,337, dated Mar. 11, 1997) for Gaming Ticket Dispenser Apparatus and Method of Play and which was, in turn, a continuation of U.S. patent application Ser. No. 08/300,130, filed Sep. 2, 1994, for Electronic Gaming Apparatus and Method (abandoned) and which was, in turn, a continuation-in-part of my U.S. patent application Ser. No. 08/999,268, filed Nov. 16, 1992 (now U.S. Pat. No. 5,337,975, dated Jan. 3, 1995) for Electronic Gaming Apparatus and Method and which was, in turn, a continuation-in-part of my U.S. patent application Ser. No. 08/879,747, filed May 6, 1992, for Electronic Gaming Apparatus (now U.S. Pat. No. 5,348,299, dated Jan. 3, 1995. This application is also based on or related to U.S. patent application Ser. No. 906,108, filed Sep. 14, 1995, for Electronic Gaming Apparatus and Method (now U.S. Pat. No. 5,487,544, dated Jan. 30, 1996 and U.S. patent application Ser. No. 08/512,062, filed Aug. 7, 1996 (now U.S. Pat. No. 5,645,485, dated Jul. 8, 1997) for Multi-Ply Ticket and Electronic Ticket Dispensing Mechanism (now U.S. Pat. No. 5,645,485, dated Jul. 8, 1997).

BACKGROUND OF THE INVENTION

1. Field of the Invention

This invention relates in general to certain new and useful improvements in electronic technological aids which assist in a method of playing a game of chance and, more particularly, to an apparatus which is capable of dispensing tickets containing indicia and displaying on a monitor indicia corresponding to that contained on the dispensed ticket and to the tickets used therewith.

2. Brief Description of Related Art

With the recent advances in electronic circuitry, there have been many attempts to automate games and particularly, games of gambling which were heretofore played with little or no electronic game operation. These attempts to automate games have become even more pronounced in view of the recent advances in miniature microprocessor technology.

One of the games, for example, which was previously played without any type of electronic interaction was the game of poker. This necessarily involved a dealer and a plurality of players utilizing playing cards. Recently, however, the game of poker has been automated and can literally be played by actuating selected combinations of push buttons on an electronic gaming device which may or may not include a display screen. Other prior art games which involve playing cards, e.g. the game of Keno, have also been automated so as to enable playing on an electronic game apparatus of this type. These prior art electronic gaming apparatus effectively allow for the play of a game which is facsimile of the real game, that is, it attempts to correspond generally to the real game. The prior art gaming apparatus are true gaming apparatus in which the simulation of the game can only be played on the apparatus, which is in distinction of the present invention which serves as a technical aid and the game can be played independently of the apparatus.

In the conventional game of Pull-Tab, frequently played in gaming establishments, a large number of cards, or similar substrates, are located in a box or other open container. Each of the cards are printed with some type of indicia which may be a number, a symbol or the like and only a limited number of the cards in this box or other container have a winning indicia. Each of the indicia are covered by a removable cover sheet having a tab thereon and hence, the cards are referred to as "Pull Tabs."

Upon appropriate payment by a player, a clerk will remove one of the cards from the container and provide the same to a player. Since the indicia are covered by the removable cover sheet, and since the card with winning indicia are randomly located within the container, neither the dealer nor the player know if the player is receiving a card with a winning indicia until such time as the tab is engaged and the cover sheet is removed.

In Class II gaming a certain limited scope of gaming activity is permitted. In Class III gaming activities, games of chance are based on random electronically generated results as, for example, in the game of Keno, poker, or in the play of slot machines. These games are only available in a limited number of jurisdictions in the United States. Except for teachings in U.S. Patents of the applicant herein, and upon which this present application is based, there is presently no prior art gaming device which is capable of effectively assisting in the play of a known "Class II" game. This is particularly true when the game is operated under certain conditions, e.g. along with another specific gaming activity.

This apparatus of the present invention assists in the play of the game so that the game can be played with enhanced entertainment and appeal. In effect, the apparatus enables the game to be played so that it can present the entertainment and enjoyment and enhanced appeal of a Class III game, but where the apparatus is only enabling the play of a Class II game. In this respect, the apparatus allows for the play of a game in such manner that it is perceived of as a so-called "Class III" game, but nevertheless remains within and strictly conforms to those standards required for a Class II game. A gaming apparatus which could operate on the basis of a Class II gaming activity, as described above, but which generates responses similar to, a Class III gaming apparatus, is highly desirable.

The present invention relies on an innovation which electronically assists in the play of the game as, for example, in a game of Pull Tab utilizing technology and which thereby allows operators of these games to effectively compete with Class III. This is also true for other games of Pull Tab which utilize selection of randomly arranged tickets having indicia thereon. As indicated previously, the apparatus of this invention only operates as an electronic assist. In other words, the game of the invention can be played on the apparatus or it can be played independently of the apparatus, in much the same manner. The invention only enhances the actual play of the game.

The present invention is also applicable to the automating of various other types of games, including games of playing cards, as hereinafter described, and is particularly adaptable to games which have a plurality of tickets or substrates bearing indicia thereon in the nature of playing cards or the cards used in a game of chance.

OBJECTS OF THE INVENTION

It is therefore, one of the primary objects of the present inventions to provide an electronic apparatus which is capable of dispensing tickets which all contain indicia and yet only a limited, but predetermined, number of tickets contain winning indicia or scoring indicia.

It is another object of the present invention to provide an electronic apparatus capable of dispensing playing tickets and where all of the tickets will contain indicia and with only a specified number of the tickets in a lot containing winning indicia such that a player of the game plays against players who may play other electronically operable apparatus, which use tickets contained in a lot thereof.

It is another important object of the present invention to provide an apparatus of the type stated in which a display member on the apparatus displays the indicia on a dispensed ticket in such a manner as though the indicia is on rotating wheels or appears to be on rotating wheels.

It is yet another object of the present invention to provide an apparatus of the type stated in which a code associated with the ticket is read and converted into signals capable of either generating a display on a computer monitor in a form in which the display appears to be rotating wheels or otherwise which generate signals causing rotating of actual apparatus display wheels.

It is a further object of the present invention to provide an apparatus of the type stated which automates and provides security in a game of chance previously played with a plurality of playing tickets in a container and adapted for dispensing from the container.

It is also an object of the present invention to provide an apparatus of the type stated which is highly effective and secure for automating and playing the game known as "Pull Tab".

It is an additional object of the present invention to provide an apparatus of the type stated which can be constructed at a relatively low cost and which is highly adaptable for the playing of a number of games which heretofore were played in a non-automated fashion.

It is an additional object of the present invention to provide a method of automating a game previously played with playing pieces or substrates dispensed from an open container.

It is still another object of the present invention to provide a method of playing a game involving the dispensing of a ticket containing indicia and where only a limited number of the tickets contain winning indicia.

With the above and other objects in view, my invention resides in the novel features of form, construction, arrangement and combinations of parts presently described and pointed out in the claims.

BRIEF SUMMARY OF THE INVENTION

The present invention relates to an electronic apparatus, which in a broad aspect, is capable of dispensing a gaming ticket containing indicia thereon upon actuation of the apparatus. As indicated previously, a large number of tickets are available in the apparatus and only a limited number of these tickets contain winning or scoring indicia. Furthermore, the tickets containing the winning or scoring indicia are randomly distributed throughout the large group of tickets and are randomly distributed throughout a group of dispensers.

The apparatus of the invention is frequently referred to as a "electronic apparatus" herein. However, the apparatus in a preferred embodiment actually adopts the form of an electronic dispenser as, for example, an electronic ticket dispenser. Thus, in accordance with the present invention, the term "electronic apparatus" will frequently be referred to as an electronic ticket dispenser.

All of the tickets used in the apparatus of the present invention are pre-printed with the indicia thereon. In one embodiment of the invention, the tickets are pre-cut, that is, they are individual tickets which contain the indicia and which may be dispensed from a holder of a large number of these tickets. In another embodiment, the ticket may be severed from a roll or strip containing ticket segments thereon. Apparatus of each of these types are hereinafter described in more detail.

In one embodiment, the electronic apparatus contains a primary strip which can be subdivided into individual segments and where each segment contains the indicia thereon. This strip of segments may be in the form of a roll containing the segments and where each segment is capable of being separated from the roll and dispensed. The apparatus also comprises a duplicate or secondary strip covering the indicia such that the indicia is not viewable until the cover strip is removed.

The apparatus further comprises means for severing a segment of the primary strip and dispensing the same upon actuation of the apparatus. In addition, a separate means for dispensing is provided which dispenses the substrate segment or so-called "game card" or "ticket".

The electronic apparatus is also capable of dispensing a segment of a strip containing indicia thereon and which displays the indicia of the dispensed segment. This embodiment of the apparatus further includes a means for severing a segment of a primary strip and dispensing the same upon actuation of this apparatus. Further, the apparatus includes means for displaying the indicia on the dispensed segment.

In this latter embodiment of the apparatus, there is provided a display monitor on the apparatus for displaying the indicia. A code corresponding to the indicia is imprinted on the ticket which contains the indicia or on the secondary strip and the apparatus includes a scanning means for scanning the code and for conversion, of the code to enable a display of the indicia.

In a more specific form, the electronic dispenser is constructed so that a player may win or lose based on the indicia on the dispensed substrate or substrate segment such that if the indicia corresponds to a winning indicia, the player will win. In like manner, if the indicia on the dispensed substrate strip do not correspond to the winning indicia, on a flare on the machine, e.g. a pay scale on the machine, the player will lose. Thus, the player may actuate the apparatus on numerous occasions in order to enable dispensing strip segments or tickets containing indicia to increase the probability of obtaining a ticket containing a winning indicia.

On each occasion, the player is usually required to deposit the necessary amount of money in order to actuate the apparatus and thereby play the game. For this latter purpose, the apparatus, such as the dispenser, will be provided with a money-receiving mechanism which will read the money and permit actuation of the play of a game if a proper amount of money has been so deposited. In like manner, the money mechanism may be in the form of a conventional coin mechanism if the game is to be played with coins, or in the form of a bill-reading and accepting mechanism if the game is to be played with paper currency denominations.

Each of the tickets which are dispensed will contain a code representative of the indicia on that ticket, as aforesaid. This code is preferably in the form of a bar code and it is only machine readable. In other words, one viewing the code would not be able to determine what indicia exists on the ticket without otherwise looking at the indicia and in essentially all cases, the indicia are covered by a removable cover strip. The bar code is printed on the rear surfaces of the pre-cut tickets.

The apparatus of the present invention also includes a display means for displaying the indicia which appears on the ticket, as aforesaid. Moreover, the indicia are displayed in precisely the same locations and arrangement as they appear on the ticket. In one of the unique aspects of the invention, the display operates so that the icons will move across the display member in a horizontal row pattern.

In one preferred embodiment of the invention, the display means actually generates a sequential display of the various icons or other indicia on the ticket. For example, each of the icons in a row are sequentially displayed and, thereafter, each of the icons in the next adjacent row are sequentially displayed one at a time, and so forth. In another embodiment, the display operates much in the same manner as a peel strip being removed from the front surface of the ticket, such that the icons in all of the rows are sequentially displayed as the strip is pulled from the surface of the ticket. The effect achieved by displaying the indicia in this fashion is that the player is actually only playing a Class II game, but because of the enhanced response of the apparatus, the player can obtain the enjoyment of a Class III game of chance. The response, however, does not change the fact that the player is playing a Class II apparatus. In other words, the player may perceive of the play of the game in a manner similar to that obtained with a Class III game, although in this case, the apparatus is only presenting enhanced responses. It still nevertheless operates in a form in which only a Class II game is played. As an example, flashing lights, sound effects and the like can be presented with the play of the game and, although this more fully simulates a Class III game, nevertheless only a Class II game is being played.

As also indicated previously, one embodiment of the apparatus operates with pre-cut individual tickets. In this case, the tickets are dispensed from a hopper containing a stack of the tickets. Again, those tickets having the winning indicia would be randomly distributed throughout this stack of tickets. Upon actuation of the apparatus, an individual ticket is released from the hopper containing the tickets and moved to a conveyor where it is then deposited in a dispensing tray. In this case, the individual ticket is also preferably provided with a removable cover sheet. In this way, if the cover sheet is removed prior to use by a player, that is an indication that someone improperly or unauthorizedly examined that particular ticket. Moreover, it precludes anyone from stacking the tickets to know the location of those tickets containing the winning or scoring indicia.

The tickets used with the apparatus are also unique in that they contain the icons or other indicia on a surface of the ticket and which is covered by a removable peel strip or other cover strip. In addition, the peel strip is designed so that it can be pulled from one edge of the ticket to an opposite edge, thereby sequentially displaying the icons in each of the plurality of rows of these icons.

In another embodiment of the invention, the individual rows of icons are provided and individual peel strips cover each of these selected rows. Thus, a first peel strip would cover the first row, a second peel strip would cover the second row, and a third peel strip would cover the third row. In this way, the first peel strip can be pulled back sequentially exposing each of the indicia in that first row. The same would hold true with the second and third rows.

As also indicated previously, the present invention can also provide individual tickets from a long strip or roll of these tickets. The tickets exist on this strip or roll as segments which can be severed from the ends of the roll and dispensed. In this embodiment of the invention, the ticket is located on a primary strip and is provided with a secondary strip disposed over the face of the primary strip having the indicia thereon.

In the preferred embodiment of the invention, all of the tickets used in this apparatus are pre-printed. The use of these pre-printed tickets is one of the important factors which distinguishes and allows the play of a Class II activity. In the Class II gaming activity of the type with which the apparatus of the invention is preferably used, the apparatus itself does not actually control the outcome of the game as to whether or not a player is a winner and only assists in the play of the game of Pull Tab. The outcome of a game is actually determined by the location of the ticket containing the winning indicia in a roll or stack of the tickets and thus, the apparatus of the invention merely dispenses but does not control whether or not a player will win or score in a gaming activity.

It can be observed that the apparatus of the present invention is highly effective in enabling the playing of the game of Pull-Tab. In accordance with the conventional game, cards or tickets or other substrates are pulled from a box by a dealer and with each substrate containing an indicia thereon. The indicia which correspond to winning indicia are randomly located throughout this container. In like manner, in the present invention, it can be seen that the indicia corresponding to winning indicia are randomly located. Thus, when a player of the game actuates the apparatus to cause the dispensing of a ticket, this is equivalent to the pulling of a ticket from an open container.

While the present invention is highly effective in enabling the play of the game of Pull-Tab, it is also not so limited. The apparatus of the invention is essentially effective in the play of various games, whether or not games which operate on the basis of dispensing of a substrate, as for example, playing cards or the like. If desired, the apparatus can also be constructed to maintain a duplicate record so that the players themselves can actually examine the record in order to determine what transactions have taken place and to maintain a written memorialization thereof. Further, this apparatus also automatically provides a display so that all members playing the game can observe the display. For this purpose, the display may be interrupted if desired, particularly if it is necessary to maintain in confidence the indicia on the ticket dispensed to any one player.

In all embodiments of the invention, the electronic apparatus is highly effective in that it has the so-called "play and feel" of a true Class III game of chance gaming apparatus, but the response does not change the fundamental fact that the apparatus only allows for the play of a Class II game. This enhanced response is due to the fact that the invention provides a display which is very similar to the spinning wheels simulating those used in the conventional Class III gaming apparatus. The apparatus also has lights and sound mechanisms which approximate those used on a Class III apparatus. Moreover, the apparatus of the invention would be similarly provided with the bells or other response generating devices of the type used in other apparatus.

The present invention thereby provides a unique and novel electronic apparatus which satisfies and fulfills all of the above-identified objects and other objects which will become more fully apparent from a consideration of the forms in which the gaming device may be embodied. One of these forms is more fully illustrated in the accompanying drawings and described in the following detailed description of the invention. However, it should be understood that the accompanying drawings and the detailed description are set forth only for purposes of illustrating the general principles of the invention and are not to be taken in a limiting sense.

BRIEF DESCRIPTION OF THE DRAWINGS

Figure 1:
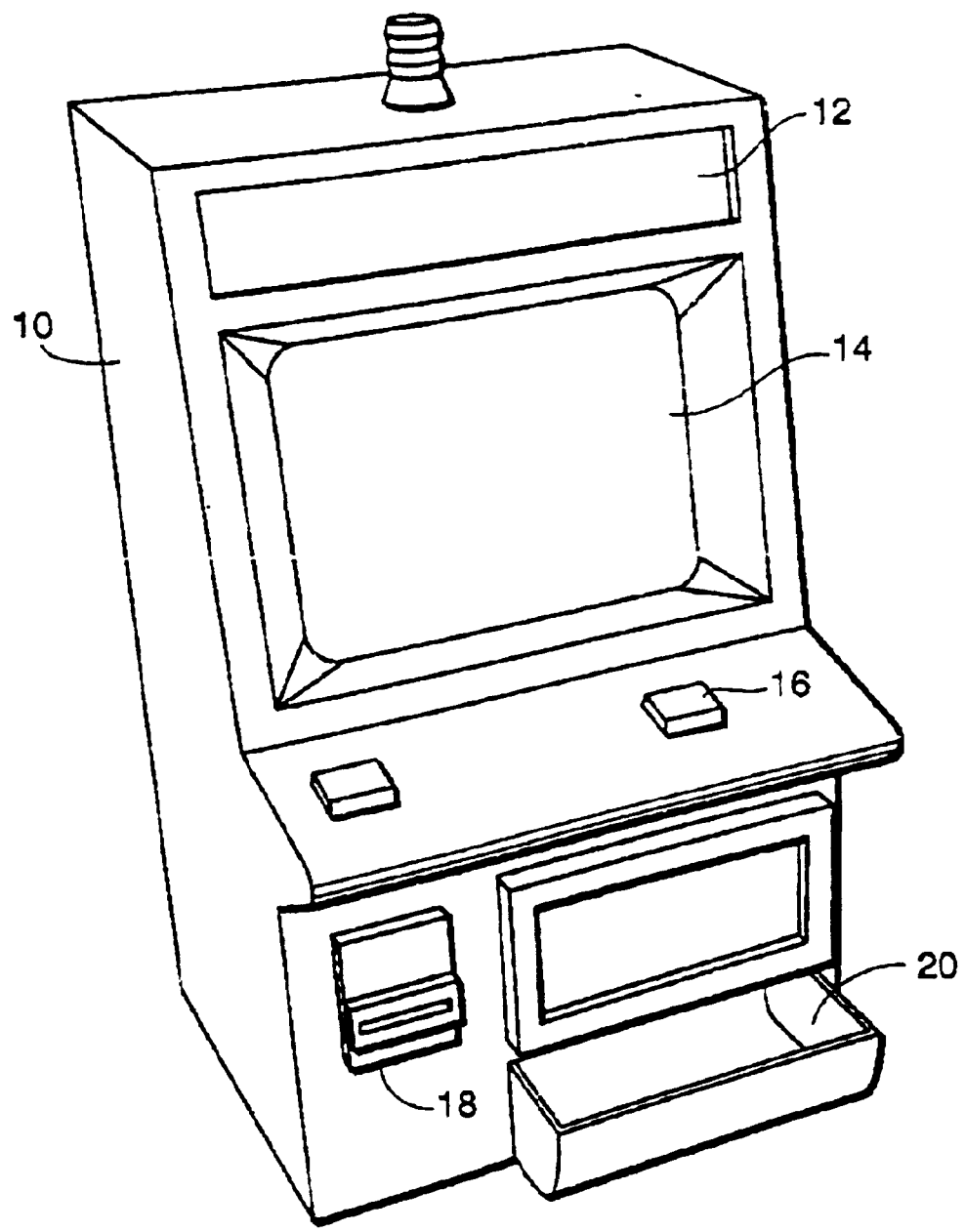
Figure 2:
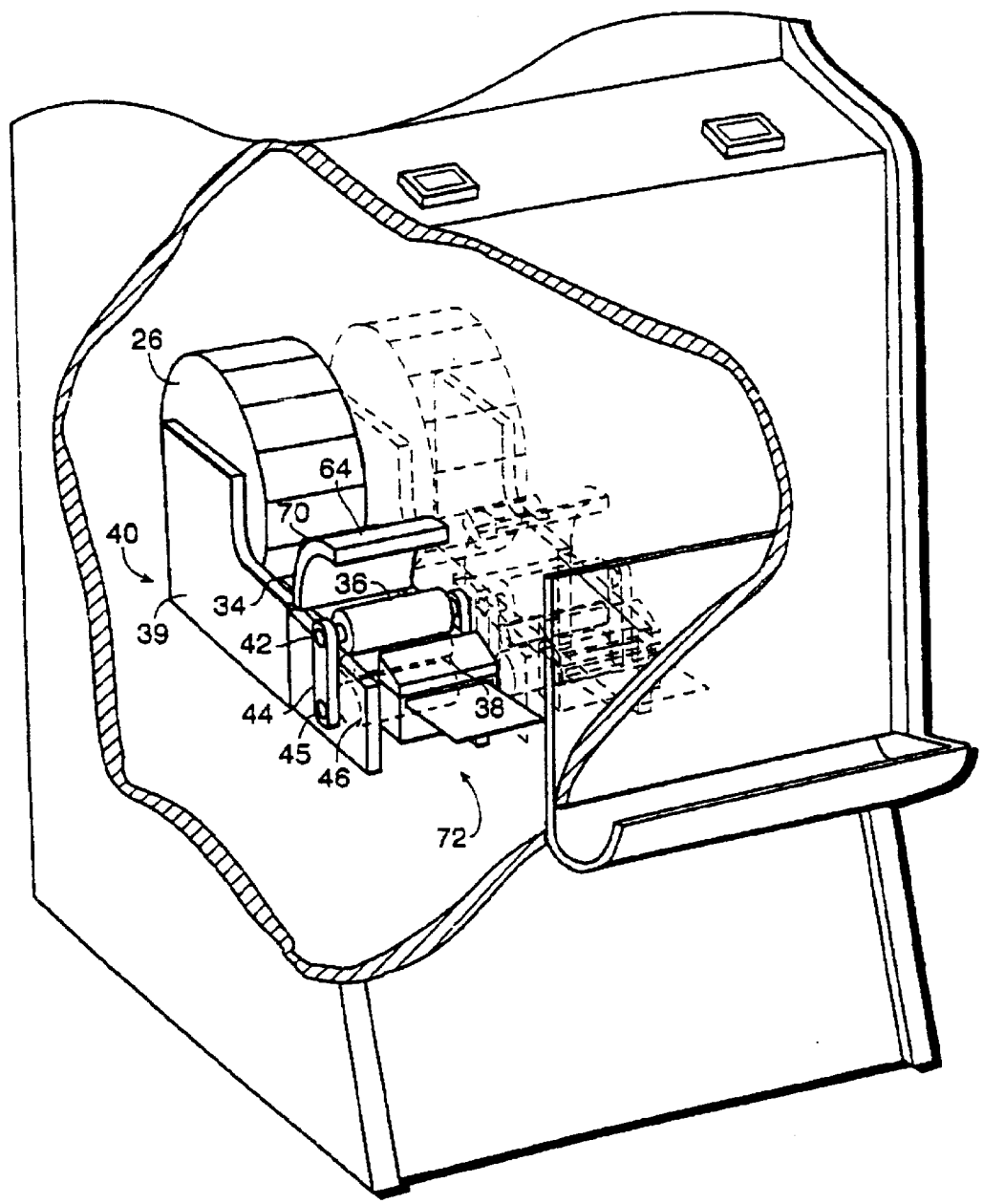
Figure 3:
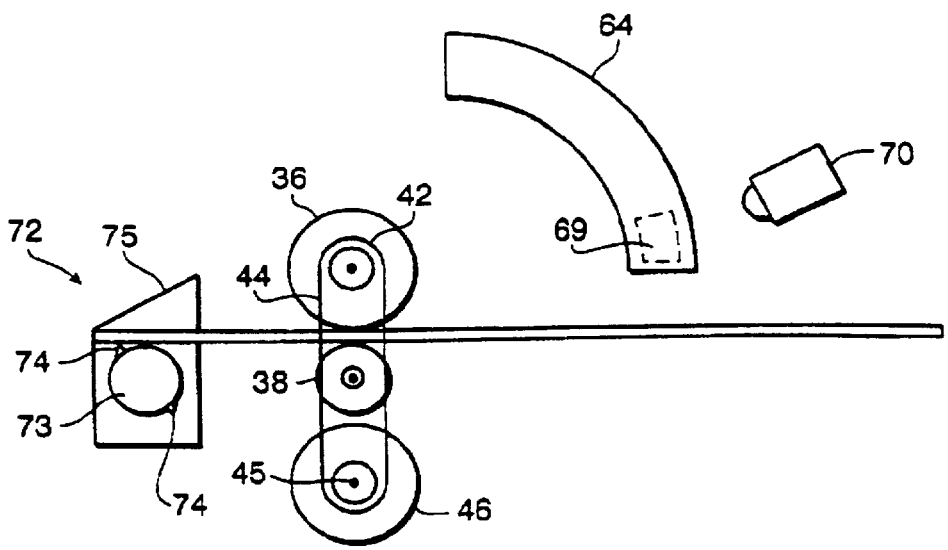
Figure 4:
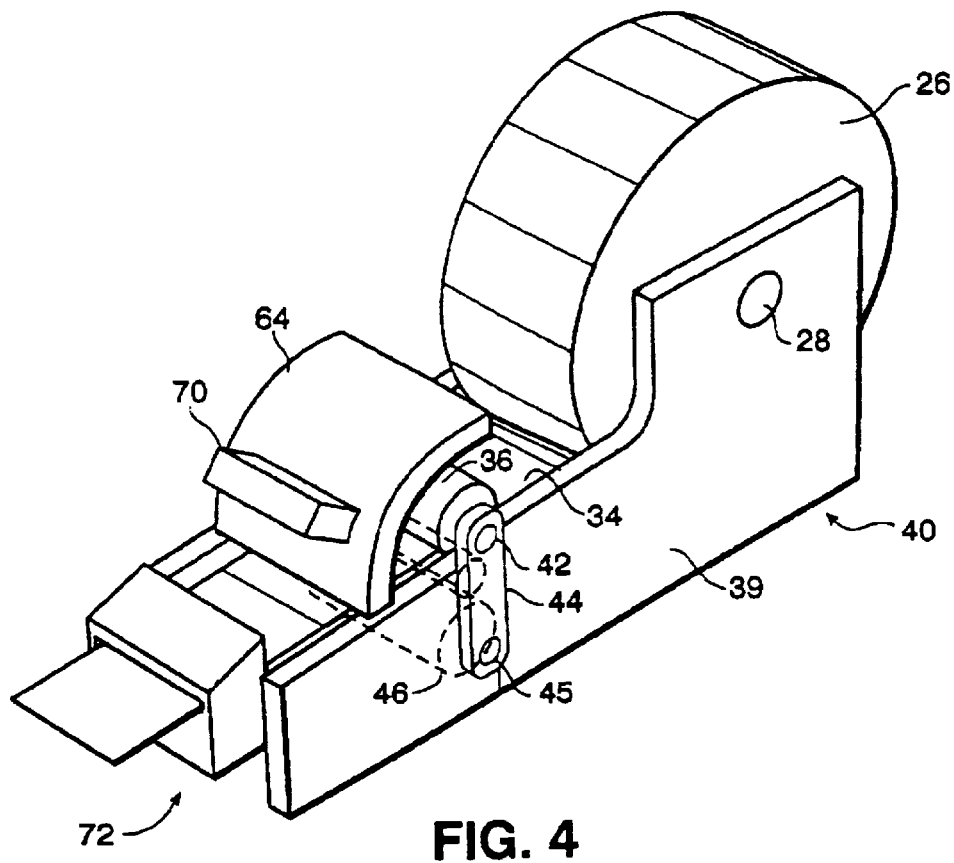
Figure 5:
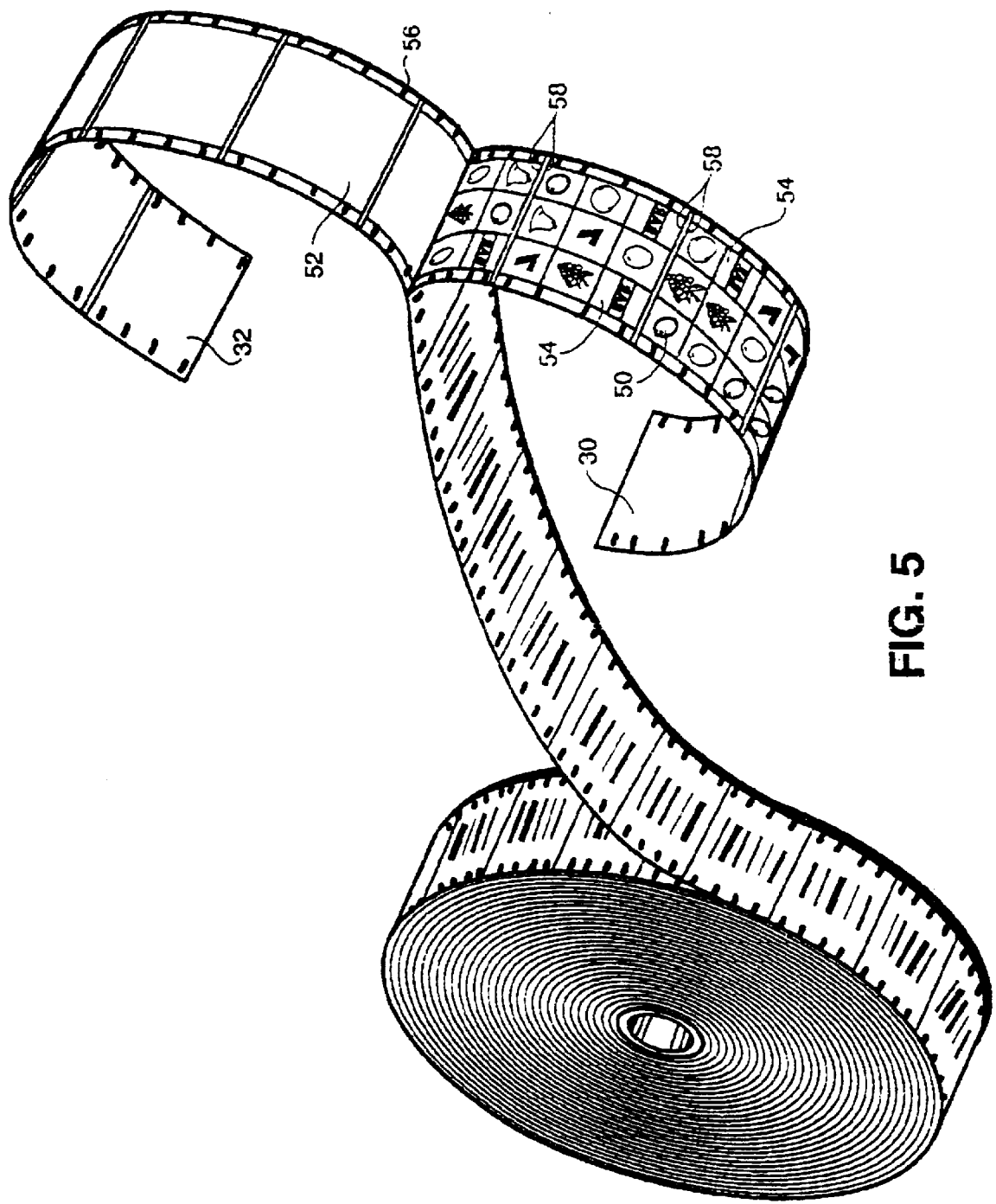
Figure 11:
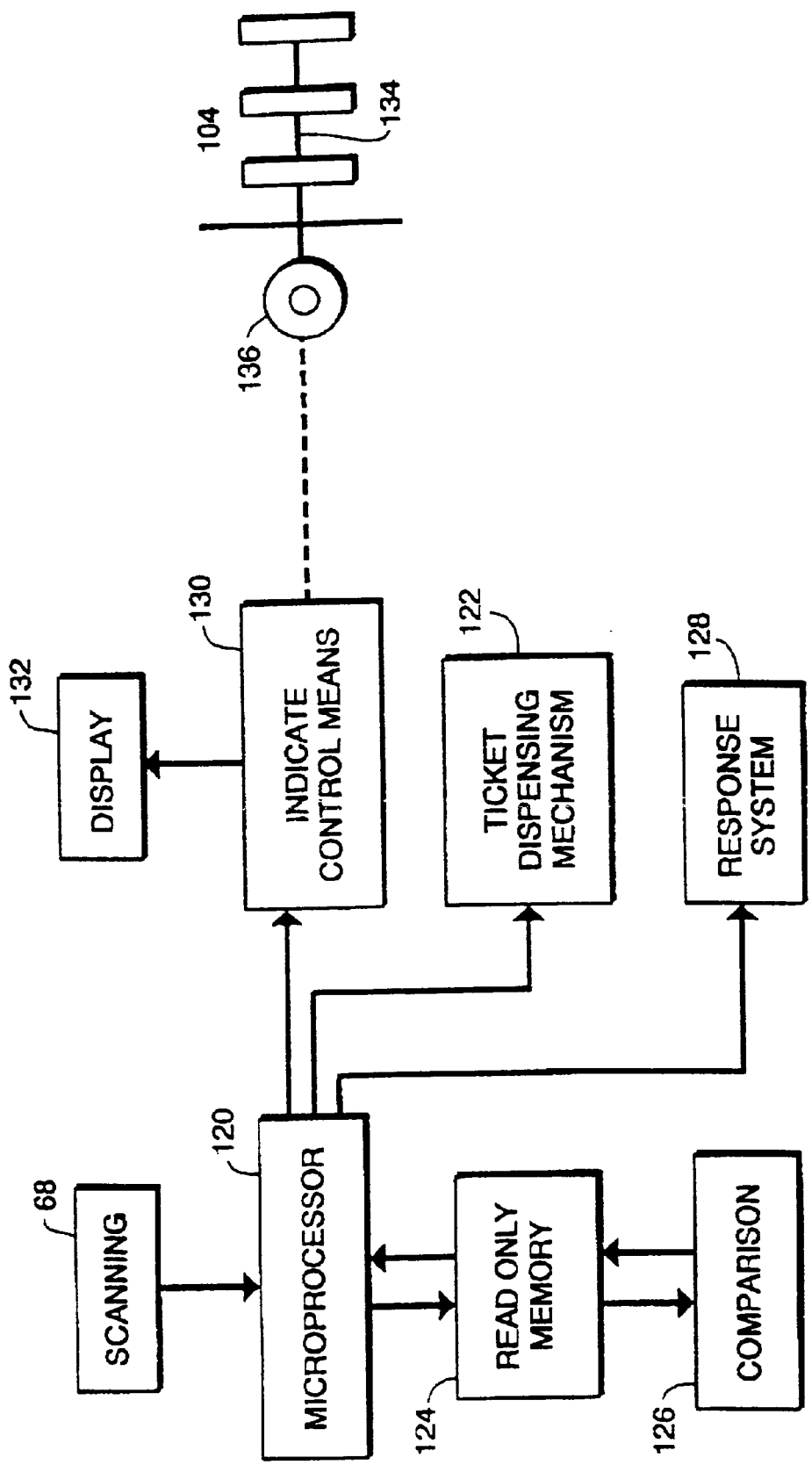
Figure 12:
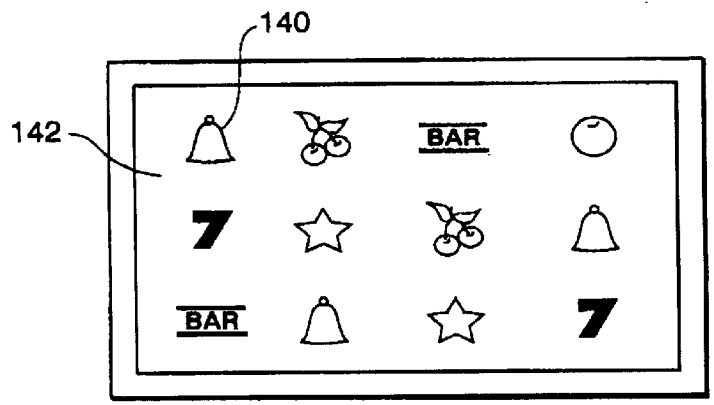
Figure 13:
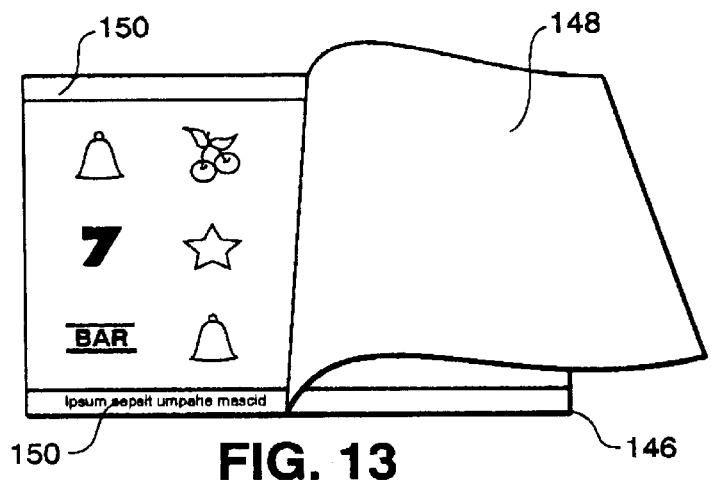
Figure 14:
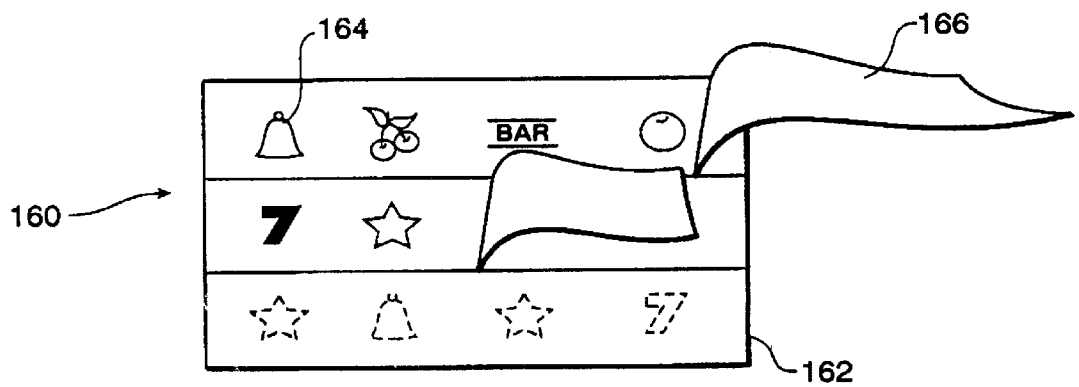

Having thus described the invention, reference will now be made to the accompanying drawings (four sheets) in which:

FIG. 1 is a perspective view of an apparatus constructed in accordance with and embodying the present invention;

FIG. 2 is a fragmentary perspective view, partially broken away and in section, and showing the major interior components forming part of the apparatus of the invention for severing and dispensing a ticket;

FIG. 3 is a schematic side elevational view showing a portion of the ticket dispensing mechanism forming part of the apparatus of the invention;

FIG. 4 is a perspective view showing a modified form of ticket dispensing mechanism;

FIG. 5 is a perspective view of the primary and juxtaposed secondary strips;

FIG. 6 is a fragmentary perspective view of the modified form of apparatus which is capable of dispensing individual tickets from the apparatus upon actuation thereof;

FIG. 7 is a front elevational view of one form of ticket used in the apparatus of FIG. 6;

FIG. 8 is a rear elevational view of the ticket used in the apparatus of FIG. 6;

FIG. 9 is a fragmentary elevational view showing a mechanism for using spinning wheels in the display of the present invention;

FIG. 10 is a front elevational view of an apparatus in accordance with the present invention which uses a raster pattern display member;

FIG. 11 is a schematic electrical circuit forming part of the apparatus of the present invention;

FIG. 12 is a plan view of display screen forming part of the apparatus of the present invention and showing a portion of the icons on that display screen being sequentially displayed;

FIG. 13 is a perspective view of one form of ticket used with the apparatus of the present invention and in which icons in each of the rows are being sequentially shown as a pull strip is removed therefrom; and FIG. 14 is a perspective view of a modified form of ticket in which individual cover strips are removed from sequential rows of icons on a ticket.

DETAILED DESCRIPTION OF A PREFERRED EMBODIMENT

Referring now in more detail and by reference characters to the drawings which illustrate a practical embodiment of the present invention, A designates one embodiment of an apparatus comprised of an upstanding housing 10 having a front face 12 with a display screen 14 capable of generating a display of indicia, such as numbers or symbols, on Pull-Tab tickets, or other tickets or substrates, as hereinafter described. The first described embodiment of the invention uses a roll or an elongate strip of the tickets which are severed therefrom. This embodiment of the apparatus A also uses a raster pattern display screen for generating the indicia thereon.

The housing 10 is also provided with one or more manually actuable keys 16 which enable a user to actuate the apparatus, as hereinafter described. The keys represent various functions which the user may select and operate the keys according to the desired function or the desired mode of playing the game.

The apparatus housing 10 is also provided with a money or currency receiver 18, which may be in the form of a coin exchanger for operating the apparatus with coins or in the form of a bill or paper currency reader. When the proper amount of money is introduced into the money receiver 18 the apparatus will be actuated to enable a play of a game and in accordance with actuation of the push button switches 16.

The money receiver 18 may be either coin operated or paper currency operated as aforesaid. In either case, these receivers are conventional in construction and therefore neither illustrated nor described in any further detail herein. However, it should be understood that the money receiver 18 is connected to a microprocessor (not shown) which is properly programmed to participate in the operation of the apparatus. Thus, and in this case, when an appropriate amount of money has been received, an initiation signal will be sent to the microprocessor and the microprocessor will initiate an actuation signal permitting the apparatus to be operated.

Finally, the housing 10 is also provided with a discharge chute 20 for dispensing of Pull-Tab tickets or other type of substrate segments used in games and which are dispensed in accordance with the play of the game, as hereinafter described.

By reference to FIG. 2, it can be observed that a ticket dispensing mechanism which forms part of the apparatus is more fully illustrated. In the preferred embodiment of the invention, it is only necessary to employ one complete ticket dispensing mechanism, as hereinafter described. However, it should be understood that a plurality of side-by-side separately actuable ticket dispensing mechanisms could be provided and adapted for either sequential play operation or for simultaneous play operation. In this way the user of the game apparatus may play only one of the play stations, or more than one station simultaneously, depending upon the proper actuation of the push-button switches 16 and upon deposit of the proper amount of money to play the desired number of play stations.

Referring again to FIG. 2, it can be observed that the major portions of the operating mechanism 24 of this apparatus are more fully illustrated. The apparatus comprises a supply spool 26 suitably mounted on a supply spool spindle 28. The supply spool 26 is provided with a primary strip 30 (see FIG. 5) in the form of a roll, and which may be dispensed from the supply spool. The primary strip 30 is formed of a substrate material which is usually a paper or thin paper-board material, but may effectively adopt any type of rollable or bendable material such as a thin plastic strip, plasticized paper strip, or the like.

The front face of the primary strip is disposed in facewise engagement with a marginally registered secondary strip 32 or so-called cover strip as shown in FIGS. 3 and 5. The supply spool 26 in the preferred embodiment is not power driven as such. Rather, a leader strip 34 of the sequentially formed tickets unwound from the roll is driven through a drive roller 36 and an idler roller 38 which are mounted on oppositely disposed face plates 39 forming part of a dispenser mechanism housing 40. The drive roller 36 is provided at one end with a sprocket 42 and is driven by means of a drive belt 44 trained around a drive sprocket 45 on a synchronous motor 46, all as best shown in FIGS. 2 and 3 of the drawings. In this way, the strip of sequential tickets is pulled through the dispenser mechanism.

It should also be understood in accordance with the present invention that the spool 26 could also be driven and cause movement of a leader strip 34 of the individually severable tickets. In either case, and particularly in the embodiment as shown in FIGS. 2 and 3, the motor 45 would be actuated by means of a signal initiated by the microprocessor (not shown). This occurs when a proper amount of money has been inserted into a money receiver on the apparatus and which is recorded by the microprocessor resulting from actuation of any one of the manually actuable switches 16.

The primary strip 30 is imprinted on its front or covered face with a plurality of indicia, such as indicia 50 which may be in the form of numbers, letters, graphic symbols, or the like. It can be seen, by reference to FIG. 5, that the indicia are each located in the individual indicia locations 54 on the primary strip 30. These indicia locations actually constitute discrete locations which are ultimately severed from the primary strip and constitute a ticket which is dispensed to the player of the apparatus. In the embodiment as illustrated, each indicia location 54 on the primary strip 30 is separated from the next adjacent indicia location by a pair of upper and lower horizontal lines 58. In actuality, it is not necessary for these lines to be printed on the substrate itself.

Each strip segment or ticket is equivalent to a pull-tab in the game of Pull-Tab. In the embodiment as illustrated, each strip segment or ticket is shown as being separated from the next adjacent strip segment on the strip by means of the black horizontal lines 58. In actuality, there may also be score lines at the location of each of these black upper and lower lines 58 which are printed on the substrate. Further, score lines are not necessarily required and do not have to exist as true perforations since the strip itself will be cut into the individual tickets or substrate sections in a manner to be hereinafter described in more detail.

The bar code associated with each of these tickets can also be used to define the location of the severing of the ticket. Thus, information could be incorporated in the bar code directly or, otherwise, the location of the bar code could be used to identify a position in which one ticket on the strip is severed from the next adjacent ticket.

The primary strip 30 and the juxtaposed cover strip 32 lie in facewise contact with one another where the indicia on the front surface of the primary strip are in facewise contact with the cover strip 32. In this way, when the two strips are in such facewise contact, the indicia in each indicia location is essentially hidden from view.

The primary strip 30 and juxtaposed cover strip 32 are passed beneath a scanner housing 64 before entry between the drive roller 36 and the idler roller 38. In this particular arrangement, the rear face, that is, the exposed face of the primary strip 30, is disposed upwardly.

The scanner housing 64 is constructed to contain a conventional scanning element 68, such as a charge-coupled diode. However, essentially any conventional scanning element may be employed. In like manner, if desired, a light source 70 could also be located in association with the scanner housing 64 for illuminating the exposed surface of the primary strip 30. As best shown in FIG. 4, the primary strip is then pushed across the scanner and introduced into a cutting mechanism 72, as hereinafter described in more detail.

The rear surface of the primary strip 30 contains a bar code in each of the discrete separate locations, as shown in FIG. 5. Accordingly, there will appear on the rear surface of the primary strip 30 a separate bar code including, but not limited to, that code information representative of the indicia on the opposite surface in each indicia location. In accordance with this arrangement, the rear face of the primary strip 30, and hence the bar code thereon, will be in readable position with respect to the scanner housing 64 and particularly the charge-couple diode 69. This bar code is not understandable and readily discernable by visual examination. However, when properly read and translated to corresponding indicia through the microprocessor, that indicia is in a form which can be displayed. Thus, the primary strip segment or ticket will have its own individual bar code corresponding to the indicia printed on the covered surface thereof. It can be seen that the dispensing apparatus of the present invention is therefore essentially totally dependent upon the ticket for functioning, although the ticket does not necessarily require the apparatus per se for functioning.

The relationship between the indicia and the bar code may be recorded in a storage mechanism and which storage mechanism can form part of the microprocessor or can be connected to and accessible by the microprocessor. In any event, the microprocessor, upon recognizing the bar code, will determine the proper indicia for display. Thereafter, the indicia is displayed on the monitor 14. In this way, the user of the apparatus will receive a ticket as hereinafter described and will also be able to observe the indicia contained on that ticket on the display screen 14.

The cutting mechanism 72 can possibly be a conventional cutting mechanism of the type which is capable of severing a plastic or like sheet strip into individual segments. In the preferred embodiment of the invention, the cutting mechanism comprises a roller 73 having a pair of oppositely disposed cutting blades 74 and which are carved and angularly disposed relative to the central axis of the roller 73. Each blade 73 will initiate one complete cut of a ticket from the strip and thereafter the roller 73 will rotate to be in position for the next cutting operation by the oppositely disposed blade 74. Each of the blades 74 will bear against an anvil 75.

The cutting mechanism must be electrically operable so that it can be actuated under the control of the microprocessor to sever the strip at a proper location which constitutes an upper or lower margin of each strip segment location.

Upon energization of the cutting mechanism as, for example, by a solenoid (not shown), the roller 73 will be rotated and the blade will force the leader strip 34 into contact with the underside of the anvil 75 and thereby literally severe a strip segment or ticket from the remaining portion of the leader strip and thereby form a dispensable ticket. Therefore, upon receipt of a proper signal initiated through the microprocessor, the cutting mechanism 72 will be operated by the solenoid and sever the primary strip 30 into the individual strip segments or tickets. The tickets are thereupon allowed to deposit in the discharge chute 20 where they may be picked up by the player of the apparatus. The tickets can then be taken to a cashier or like individual for purposes of collecting the money if any of the tickets carries a winning indicia thereon.

The front face of the primary strip 30 which contains the indicia will actually be disposed in intimate facewise contact with the forward face of the cover strip 32. Thus, the indicia on the primary strip will not be initially observable until the player separates the cover strip from the primary strip. The rear and exposed face of the primary strip will contain the bar code 56, as aforesaid, and this bar code is only machine readable, that is, it cannot be intelligibly read by a user or observer of the apparatus. The indicia, therefore, will not be intelligible to the player or observer until the apparatus dispenses the ticket and the user removes the cover strip from the primary strip, or both. The results as depicted on that ticket, namely the indicia on the ticket, is then displayed on the display screen.

FIG. 4 illustrates a slightly modified form of ticket dispensing mechanism which is similar in construction and operation to the ticket dispensing mechanism illustrated in FIG. 2. In this embodiment of the invention, the only difference between the ticket dispensing mechanism of FIG. 4 is that the position of the scanner is reversed with respect to that shown in FIG. 2. In the embodiment as shown in FIG. 4, the scanner is located immediately adjacent to, but before the ticket cutter 72 with respect to the path of movement of the tickets. In this position, the scanner will only read the tickets at the last possible moment before dispensing. Thus, and in this embodiment, the ticket is actually not read until the very last minute prior to dispensing thereof.

FIG. 6 illustrates a slightly modified form of apparatus B and which is used for the dispensing of discrete tickets 76, the latter of which is best illustrated in FIGS. 7 and 8 of the drawings. The apparatus B is similar in construction to the apparatus A except that the apparatus B utilizes a hopper 78 containing the discrete tickets 76. In this case, the hopper 78 would be provided with means for maintaining the discrete tickets 76 in a stack such as that shown. The lower end of the hopper 78 is provided with a discharge mechanism 80 and which operates by either an electrical signal or by means of a mechanical coupling, such as the rod 82, as shown in FIG. 6. The rod 82 or otherwise an electrical signal operating in conjunction with a solenoid (not shown) would operate a discharge plate 84 in the discharge mechanism 80 to allow a discharge of a discrete ticket 76.

Each discrete ticket 76 is deposited on a conveyor belt 88 trained about drums 90 and one of which is a powered drum for rotation. The conveyor belt 88 terminates at a discharge tray 92 in which the discrete ticket 76 is dropped for collecting by a player of the apparatus.

Each of the discrete tickets 76 is more fully illustrated in FIGS. 7 and 8, as aforesaid, and comprises a front face 94 and a rear face 96. The front face includes the indicia thereon as shown in FIG. 7. Moreover, the indicia is covered by a removable cover 98. The removable cover 98 is designed so that once removed, it is not readily replaceable and is capable of being discarded.

The rear face 96 of the discrete tickets 76 is provided with a bar code 100, as best shown in FIG. 8. It should be understood that this bar code could actually be included on the front face 94, or for that matter on the cover strip, if desired. However, it has been found to be preferable to provide the bar code on the rear face. Furthermore, the reading mechanism in this case could be located immediately at the lower end of the discharge mechanism 80 so as to read the bar code on the rear face of the discrete ticket 76.

FIG. 9 illustrates one form of display mechanism 102 of the present invention. This display mechanism 102 uses a plurality of rotating wheels 104 in which the indicia is printed on an annular peripheral face thereof, as shown. Each of these rotating wheels 104 are rotatable with respect to a shaft 106. In this case, the shaft 106 could actually constitute a plurality of concentric shafts with each disk or rotating reel 104 mounted on a separate one of the shafts. The shaft 106 or otherwise the shaft arrangement 106 is operated by a drive mechanism 108. This drive mechanism is conventional and therefore neither illustrated nor described in any detail herein. However, the drive mechanism 108 could be precisely that drive mechanism used for rotating the wheels in the so-called "slot machine" gaming apparatus.

FIG. 10 illustrates an embodiment of the invention using a raster pattern display screen 110. In this case, three rows of indicia are shown. Generally, the display will cause the various columns 112 of the indicia to rotate, as for example, in the direction as shown by the arrows in FIG. 10. In other words, the indicia are moved upwardly across the screen from the lower edge thereof to the upper edge, and in such manner as to generate an appearance of a rotating reel. Each of these columns of indicia will stop moving so that a selected row of indicia on the ticket will be shown at the position designated as 114, usually a row midway between the upper and lower edges of the display screen 110. All three columns of indicia will have the selected indicia within this defined row location 114.

Also in accordance with the present invention, as the indicia move upwardly across the screen, one column of indicia will not be coordinated with the next column of indicia in a fixed time relationship, that is, they will not move in coordinated horizontal rows. Actually, the first or left-hand row of indicia will first start to rotate, followed by the middle column of indicia and then followed by the right-hand column of indicia. Thereafter, the first column of indicia will stop, followed shortly thereafter by the second column of indicia, and then followed shortly thereafter by the third column of indicia. This will create an illusion as though there are actually spinning wheels behind the display member.

The present invention is provided with an indicia control means which is associated with or forms part of a microprocessor used for generating the display. In this respect, the electronic switch which is involved in generating the display is quite simple. These electronics are more fully illustrated in FIG. 12. The initial identification of whether a ticket constitutes a winning ticket, whether or not it is a discrete ticket or separated from a large strip, is performed by a scanner, such as the conventional scanning element 68. This scanner 68 is capable of reading the bar code or other type of code which may be imprinted on the ticket or a secondary strip associated with the ticket, as aforesaid. For the purposes of this invention, when a code is described as being imprinted on the ticket, it will also be understood that it may as well be on the secondary strip associated with that ticket.

In any event, after the code is read by the scanner 68, the code is introduced into a microprocessor 120. This code is effectively the translator which operates in the apparatus of the invention. This code further effectively participates in the communication between the money dispenser and the ticket dispenser. This microprocessor 120 operates the ticket dispensing mechanism represented in this FIG. 11 as 122. However, it should be understood that the term "ticket dispensing mechanism" will constitute those portions of the apparatus which cause the strip to be moved and a segment severed from the strip and dispensed if the ticket is derived from a strip of the tickets. In like manner, the ticket dispensing mechanism may constitute that mechanism for dispensing precut individual tickets, as previously described.

The microprocessor utilizes a read-only memory 124 which receives the data scanned by the scanner and introduced into the microprocessor. The memory 124 works in conjunction with a comparator 126 to determine if the ticket which is dispensed, is a winning or scoring ticket. Thus, the microprocessor 120 will be alerted as to whether or not the dispensed ticket is a winning ticket. If so, the microprocessor can cause a response system 128 to operate. Here again, the response system is designated schematically and could represent, for example, bells or sirens or blinking or flashing lights, or the like. The exact type of response system is not critical in accordance with the present invention and is therefore neither illustrated nor described in any further detail herein.

The microprocessor 120 also participates in the operation of an indicia control means 130 which may form part of the microprocessor 120, or it may be operated under control of the microprocessor 120. The indicia control means causes a display of indicia on a display member 132 which may constitute either the spinning reels or the display screen. In this case, the display member 132 represents a raster pattern display screen. The indicia control means 130 will cause the monitor, such as the display screen 132, to generate images, such as the icons or other indicia, on the display screen. Again, this indicia control means will cause the display to generate the selected display pattern under the control of the microprocessor 124.

FIG. 11 also alternatively illustrates the operation of a plurality of individual disks or wheels, such as those disks 104. However, each of the individual disks are mounted on a shaft assembly 134 which is under the control of one or more synchronous electric motors 136. Again, the connection of the shaft assembly 134 to the synchronous motor or motors 136 is only schematically illustrated, inasmuch as the exact construction is conventional and is therefore neither illustrated nor described in any further detail herein. Nevertheless, the synchronous motor or motors 136 would cause the reels or disks to rotate, much in the same manner as the wheels or disks would rotate in a conventional slot machine gaming apparatus.

FIG. 12 illustrates a modified embodiment of apparatus in which the indicia, in the form of icons, are sequentially displayed on a display screen. Thus, in the embodiment of FIG. 12, various icons 140 are displayed on a display screen 142 sequentially in a row and sequentially row by row. In FIG. 12, it can be observed that all four icons in the first row are sequentially displayed and that two of the icons in the second row or middle row are sequentially displayed with the third and fourth icons in that second row to be shortly thereafter sequentially displayed. Finally, it can be seen that the icons in the third or last row still remain undisplayed and would be displayed sequentially after the second row has been fully displayed. The processor used in the apparatus of the present invention would be programmed to properly display the icons in this sequential format.

It should be observed that all of the icons in each of the rows could be sequentially displayed, such that all of the icons in the first column of all rows would be displayed, all of the icons in the second column of each of the rows would be displayed, followed by the icons in the third column and, potentially, the icons in the fourth column.

FIG. 13 illustrates an embodiment of a ticket having a ticket substrate 146 and a removable cover strip 148. In this case, the tear strip 148 is being pulled from the right-hand edge of the strip back toward the left-hand edge. Although the tear strip could cover the full surface of the strip, such is not necessary and that the tear strip would only have to be pulled back from the position covering the icons. Thus, upper and lower margins 150, for example, potentially containing information, may remain unexposed or otherwise exposed. The cover strip 148 would be effectively pulled back from the full surface having the icons thereon, but not necessarily the front full surface of the strip. However, it can be observed that as the tear strip 148 is pulled back to the right-hand edge, it will sequentially display the icons in all of the rows simultaneously.

FIG. 14 illustrate another modified form of ticket 160 constructed in accordance with the present invention. In this case, the ticket 160 comprises a ticket substrate 162 also having indicia 164 imprinted thereon. As opposed to a single removable cover strip 148, the ticket 160 uses a plurality (three as shown) individual strips 166. Thus, a first strip 166 covers the first row of icons 164. A second strip 166 covers all of the icons in that second row and it can be seen that the second of these strips 166 has been pulled back to expose at least two of the icons in a row with two of the other icons in that row remaining unexposed. In like manner, the third or bottom cover strip remains on the substrate 162 covering all of the icons in that last row.

The apparatus and method of the present invention are highly effective in operating as a technological aid in the play of the conventional game of Pull-Tab, as aforesaid. In this case, and in a conventional Pull-Tab game, the player removes the opaque cover sheet on the tap so that he or she can examine the indicia to thereby determine if that player was or was not a winner. In the game apparatus of the present invention, essentially the same operation is taking place. However, rather than having a clerk select a Pull-Tab or ticket in a random location from a box of like tabs, the apparatus of the invention literally dispenses the next randomly located Pull-Tab or discrete ticket. No player, or any other party operating the machine or anyone else, for that matter, will know what indicia is contained on the ticket dispensed to the player until that indicia is either displayed or read from the ticket, or both.

In the present invention, the apparatus is actually passive, as opposed to active and does not determine the fate or outcome of a particular game or play. In this case, the apparatus is passive in that it only dispenses a ticket which will determine whether or not the player wins the game, and in addition may display the results appearing on that ticket. Thus, if the ticket is dispensed from a roll or a stack of tickets, the actual location in that roll or that stack of tickets will effectively determine when and if a player receives a winning or a scoring ticket.

Each of the rolls, or for that matter stacks of tickets, are prepared in a printing apparatus which is operated under conditions such that the operator of the printing apparatus does not know where winning or scoring tickets may be located in a roll of the tickets. Moreover, the tickets are covered by a removable cover strip and, if that strip is removed, it cannot be reattached such that tampering with any ticket would be readily observable. The actual printing of the tickets and the packaging thereof is essentially conducted under conditions in which the location of winning and scoring tickets are not known.

It is known that maybe twenty-five tickets, for example, will constitute winning tickets, but essentially no one knows where those tickets are in each roll and in which roll those tickets may appear. Consequently, each player effectively is playing against all other players of the game. This is important in that it actually increases participation in the play of the game. It also allows for the play of a Class II game since the player does not rely upon the apparatus to determine the outcome of any particular play. As indicated previously, the apparatus itself is actually passive in that it only dispenses the ticket and generates responses. However, and as also indicated above, if the player does have a winning indicia, the apparatus can be constructed so as to provide a response similar to a Class III gaming apparatus.

Thus, there has been illustrated and described a unique and novel electronic apparatus and a method of use therefor functioning as a technological aid in a play of a game and which fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by Letters Patent is:

1. A unique multi-ply ticket used in a game activity having a chance of winning or scoring in multiple plays and which can be dispensable from any of a plurality of selected ticket dispensers, said ticket being comprised of:
   a) a first ply having an inner surface and an exterior surface;
   b) information bearing indicia presented on and readily viewable on said inner surface when exposed;
   c) a second ply covering the inner surface of said first ply rendering the inner surface non-viewable until the second ply is removed therefrom and when said second ply is removed from the first ply it renders the indicia on the inner surface of the first ply to be viewable;
   d) said first and second plies being removably secured together in such manner that when the second ply is removed the plies cannot be recombined in the original form without significantly altering the ticket such that any tampering with the ticket would be evident; and
   e) a code representative of the indicia on the inner surface of the first ply located on an exterior face of said ticket and which is unintelligible by visual examination and only machine readable, said code being usable to create a display representative of indicia on the inner surface of the first ply.

2. The multi-ply ticket of claim 1 further characterized in that the ticket is severed from a strip of such endwise located tickets on said strip before being dispensed.

3. The ticket of claim 2 further characterized in that each of said tickets comprise one ticket of a group of tickets and where certain of the tickets in the group contain winning indicia and the tickets containing the winning indicia are randomly distributed throughout the group.

4. The ticket of claim 1 further characterized in that said code is readable to generate a display equivalent to that of the original indicia on the dispensed ticket.

5. The ticket of claim 1 further characterized in that said ticket is comprised of a plurality of cover strips with a separate one cover strips being located over a separate row of indicia on the ticket with that the indicia of each of the rows can be individually and sequentially displayed.

6. A ticket used in a game activity having a chance of winning or scoring in multiple plays played with an electronic apparatus assisting in the play of the game and which ticket bears indicia relating to the game of chance, said ticket comprising:
   a) a substrate having a first surface and a second surface;
   b) game ticket information bearing indicia on the first surface of the substrate;
   c) a removable cover strip disposed over said first surface making said first surface an inner surface and the second surface an exterior surface, said cover strip rendering the game ticket indicia on the first surface of the substrate completely concealed and non-viewable until the cover strip is removed from its concealing position over the game ticket indicia on the inner surface of the substrate and so that when the cover strip is removed the game ticket indicia on the inner surface of said substrate is viewable;
   d) means causing said cover strip to be releasably secured to said substrate in such manner that when the cover strip is removed from the substrate, it cannot be recombined to the substrate in the original form, such that tampering of the ticket will become apparent if the cover strip is removed from its concealing position;
   e) each of said tickets forming part of a group of said tickets and where the indicia on certain of the tickets differs from the indicia on other of the tickets and only certain of the tickets in the group containing winning indicia and where the tickets containing the winning indicia are randomly distributed throughout the group of tickets; and
   f) a code representative of the indicia on the inner surface of the substrate located on said ticket and which is unintelligible by visual examination and only machine readable, said code being usable to create a display representative of and corresponding to indicia on the inner surface of the substrate.

7. The ticket of claim 6 further characterized in that the ticket is part of a strip of such tickets and is severed therefrom.

8. The ticket of claim 6 further characterized in that said code is readable to generate a display of the original indicia on the dispensed ticket.

9. An electronic apparatus capable of playing a game having a chance of winning or scoring in multiple plays using a plurality of individual tickets with each containing indicia thereon which may represent any winning or scoring combination, and where each ticket has a machine readable code representative of or correlated to the indicia on that ticket with a cover strip removable from a position over the indicia to uncover the indicia in a specified pattern as the cover strip is removed, and where only one or more of the tickets may contain winning or scoring indicia thereon, said apparatus comprising:
   a) means for initiating a play of the apparatus with a ticket containing indicia from the plurality of tickets thereof and where the indicia are an integral part of the play of the game of chance;
   b) means for reading the machine readable code on the ticket to enable a generation of indicia generally correlated to or representative of that indicia on the ticket so that the generated indicia may be displayed;
   c) a display means on said apparatus displaying the indicia generated from the code so that the generated and displayed indicia is generally correlated to or representative of that on the ticket so that a player of the game using the apparatus may observe the indicia on the ticket and/or the indicia on the display means in the play of the game and determine whether the player won or scored in the game of chance; and
   d) indicia control means for causing the indicia to be displayed on the display means in the same pattern as the indicia on the ticket is displayed.

10. The electronic apparatus of claim 9 further characterized in that the indicia on the ticket are sequentially displayed across the ticket and that said indicia control means causes each of the indicia to be sequentially displaced across the display means.

11. The electronic apparatus of claim 9 further characterized in that the ticket indicia are displayed by removing the cover strip horizontally from one side to the other and that indicia control means causes each of the indicia to be displayed horizontally across the display means from one side to the other.

12. The electronic apparatus of claim 9 further characterized in that said tickets are preprinted with the indicia prior to use in said apparatus so that an element of chance in the game is determined at the time of production of the tickets, permitting the game to be played independently of and without the apparatus by enabling the player of the game to visually examine the indicia on the ticket and determine whether or not the ticket of the player is or is not a winning or scoring ticket.

13. The electronic apparatus of claim 9 further characterized in that the indicia on the ticket is imprinted on one surface thereof and the machine readable code is on an opposite surface of the ticket.

14. The electronic apparatus of claim 9 further characterized in that a processing means is associated with the display means for causing generation of the indicia from the code correlated to or representative of that on the ticket and the processing means operates to determine if the indicia was winning or scoring indicia.

15. An electronic apparatus capable of playing a game having a chance of winning or scoring in multiple plays using a plurality of individual tickets with each containing indicia thereon which may represent winning or scoring combinations and where each ticket has a machine readable code representative of or correlated to the indicia on that ticket, and where only certain of the tickets may contain winning or scoring indicia thereon, said apparatus comprising:

a) means for initiating a play of the apparatus with a ticket containing indicia from the plurality of tickets thereof and where the indicia are an integral part of the play of the game;

b) display means on said apparatus for displaying indicia generated from the code correlated to or representative of the indicia on the tickets so that the generated indicia may be displayed;

c) said tickets being preprinted with the indicia prior to use in said apparatus so that an element of chance in the game is determined at the time of production of the tickets, permitting the game to be played independently of and without the apparatus by enabling the player of the game to visually examine the indicia on the ticket and determine whether or not the ticket of the player is or is not a winning or scoring ticket; and d) means for causing the indicia presented on the display means to be sequentially displayed across the display means and where the indicia on the display means corresponds to a sequential display of those indicia on the ticket, such that a player of the apparatus may observe the indicia on the ticket and/or the indicia on the display means in the play of the game and determine whether the player won or scored in the game of chance.

16. The electronic apparatus of claim 15 further characterized:

a) said code on said tickets is machine readable and not readily discernable by visual examination; and b) means is located in said apparatus for reading the code corresponding to the indicia of the ticket which is being read.

17. The electronic apparatus of claim 15 further characterized in that said ticket contains the indicia in a plurality of rows and each row of indicia is sequentially displayed on the display means individually one at a time.

18. A method of playing a game having a chance of winning or scoring in multiple plays with an electronic apparatus using a plurality of individual tickets with each containing indicia thereon which may represent any winning or scoring combination and where each ticket has a machine readable code representative of or correlated to the indicia on that ticket and where only one or more of the tickets may contain winning or scoring indicia thereon, said method comprising:

a) playing a game with a ticket containing indicia from the plurality of tickets;

b) removing a cover strip over the indicia so that the indicia are sequentially displayed across the ticket;

c) determining if the indicia was a winning or scoring indicia;

d) reading the machine readable code on a ticket which is being played and generating indicia representative of or correlated to that indicia on the ticket so that the generated indicia may be displayed; and e) displaying the indicia generated from the machine readable code sequentially across a display screen so that a player of the apparatus may observe the indicia on the ticket and/or the indicia on the display means in the play of the game in essentially the same order and determine whether the player won or scored in the game of chance.

19. The method of claim 18 further characterized in that each of the tickets are in a roll of the tickets.

20. The method of claim 18 further characterized in that the tickets constitutes a stack of precut tickets.

21. The method of claim 18 further characterized in that the apparatus aids in the game of Pull-Tab and each dispensed ticket constitutes a separate Pull-Tab.

22. The method of claim 18 further characterized in that the indicia are an integral part of the play of the game and the indicia having been preprinted on the ticket, so that any element of chance is determined at the time of production of the tickets.

* * * * *